(12) United States Patent
Sugie et al.

(10) Patent No.: US 7,676,251 B2
(45) Date of Patent: Mar. 9, 2010

(54) WIRELESS COMMUNICATION SYSTEM, ELECTRONIC PRICE TAG SYSTEM, WIRELESS COMMUNICATION APPARATUS, COMMUNICATION TERMINAL APPARATUS, AND WIRELESS COMMUNICATION METHOD

(75) Inventors: Noboru Sugie, Tama (JP); Youichi Kimura, Tama (JP); Katsuhiro Sukegawa, Tama (JP)

(73) Assignee: Mitsumi Electric Co., Ltd. (JP)

( * ) Notice: Subject to any disclaimer, the term of this patent is extended or adjusted under 35 U.S.C. 154(b) by 1056 days.

(21) Appl. No.: 11/048,008

(22) Filed: Jan. 31, 2005

(65) Prior Publication Data

US 2005/0218208 A1 Oct. 6, 2005

(30) Foreign Application Priority Data

Apr. 5, 2004 (JP) ............................. 2004-111266

(51) Int. Cl.
*H04B 1/38* (2006.01)
(52) U.S. Cl. ...................... 455/574; 340/5.1; 340/5.91; 235/378
(58) Field of Classification Search ................. 455/574, 455/41.2–41.3; 340/5.1, 5.91; 235/378
See application file for complete search history.

(56) References Cited

U.S. PATENT DOCUMENTS 4,766,295 A 8/1988 Davis et al.
6,044,359 A 3/2000 Goodwin
6,130,603 A * 10/2000 Briechle .................. 340/10.34

FOREIGN PATENT DOCUMENTS

| EP | 262 994 | * 7/1987 |
| EP | 0 262 994 | 4/1988 |
| EP | 0 921 460 | 6/1999 |
| JP | 11219148 | 8/1999 |
| JP | 2001160990 | 6/2001 |
| JP | 2002057617 | 2/2002 |

OTHER PUBLICATIONS 3-page European Search Report citing the above references, Oct. 11, 2005.

* cited by examiner

*Primary Examiner*—Nay A Maung
*Assistant Examiner*—Angelica M Perez
(74) *Attorney, Agent, or Firm*—Baker + Hostetler, LLP

(57) ABSTRACT

A wireless communication system is provided for establishing wireless communication between a wireless communication apparatus and a battery-driven communication terminal apparatus in which system the power consumption rate of the communication terminal apparatus can be reduced. The wireless communication system includes a trigger signal transmission line for transmitting a trigger signal from the wireless communication apparatus to the communication terminal apparatus, and a data communication line for establishing data communication between the wireless communication apparatus and the communication terminal apparatus. The data communication between the wireless communication apparatus and the communication terminal apparatus is established in response to the trigger signal that is transmitted by the trigger signal transmission line.

14 Claims, 9 Drawing Sheets

WIRELESS COMMUNICATION SYSTEM, ELECTRONIC PRICE TAG SYSTEM, WIRELESS COMMUNICATION APPARATUS, COMMUNICATION TERMINAL APPARATUS, AND WIRELESS COMMUNICATION METHOD

BACKGROUND OF THE INVENTION

1. Field of the Invention

The present invention relates generally to a wireless communication system, an electronic price tag system, a wireless communication apparatus, a communication terminal apparatus, and a wireless communication method, and more particularly to a wireless communication system and apparatus for establishing wireless communication between a wireless communication apparatus and a communication terminal apparatus.

2. Description of the Related Art

Generally, at retail stores, price tags are provided on shelves stocking commodities. In recent years and continuing, with the growing competition between rivaling stores, there is an increasing demand for a system for enabling prices of commodities to be flexibly changed. In view of this trend, a so-called electronic price tag system is being developed that is capable of easily reflecting the changes made to prices of commodities on price tags.

The electronic price tag system includes electronic price tags implementing liquid crystal, for example, which are capable of electrically changing their price displays in response to instructions from a computer, for example. In this way, prices of commodities may be flexibly changed and reflected on the price tags. In the electronic price tag system, the electronic price tags do not have to be replaced when prices of commodities are changed. The electronic price tags are battery-driven and are arranged to be capable of establishing data communication for exchanging data pertaining to prices, for example, through wireless communication.

Since the electronic tags are battery-driven, power consumption rate within the electronic tags is preferably minimized, and in this regard, a wireless communication system using infrared light has been proposed in the conventional art. However, in a wireless communication system using infrared light, the wireless communication may be easily hampered by factors such as obstacles and external light.

In turn, a wireless communication system using a radio communication scheme has been proposed, which system is less vulnerable to factors such as obstacles and noise and are capable establishing data communication with accuracy and reliability. Particularly, a wireless communication system using a wireless communication scheme such as that conforming to the IEEE802.15.1 standard or the IEEE802.15.4 standard is being widely contemplated.

FIG.1 is a diagram illustrating a data communication operation using a radio communication scheme according to the prior art.

According to a communication scheme conforming to the IEEE802.15.1 or IEEE802.15.4 standard, a data request and a data response are periodically exchanged at predetermined time intervals. In such an arrangement, in order to reduce power consumption, a communication IC for realizing the communication scheme may be set to sleep mode during the time in which communication is not being established, and the communication IC may be set to data mode only when a data request and a data response are being exchanged (i.e., when data communication is established). However, in such a case, a data request and a data response still have to be exchanged at predetermined time intervals, and thereby, as is shown in FIG. 1, a communication apparatus is switched between sleep mode and data mode several times per second.

It is noted that the power consumption level during data communication may reach up to several dozen mA. However, the price of a commodity at a store may only be changed a few times within one day. In other words, in the above-described arrangement, a communication apparatus is switched between sleep mode and data mode several times per second even though actual data communication is rarely conducted, and thereby, a large amount of power is wasted. As a result, the service life of a battery of an electronic price tag is needlessly reduced.

SUMMARY OF THE INVENTION

Accordingly, the present invention has been conceived in response to the one or more problems of the related art and its object is to reduce the power consumption of a communication terminal apparatus used in a wireless communication system.

According to an aspect of the present invention, a wireless communication system is provided that is configured to establish wireless communication between a wireless communication apparatus and a communication terminal apparatus, the system including:

a trigger signal transmission line configured to transmit a trigger signal from the wireless communication apparatus to the communication terminal apparatus; and a data communication line configured to establish data communication between the wireless communication apparatus and the communication terminal apparatus;

wherein the data communication between the wireless communication apparatus and the communication terminal apparatus is established in response to the trigger signal that is transmitted by the trigger signal transmission line.

According to an embodiment of the present invention, the wireless communication apparatus is configured to generate a signal including identification code for identifying the communication terminal apparatus as the trigger signal, and the communication terminal apparatus is configured to identify the identification code included in the trigger signal and conduct a data communication operation based on the identification code.

According to another embodiment of the present invention, the wireless communication apparatus includes a trigger transmitting unit configured to transmit the trigger signal, a wireless communication apparatus side data communication unit configured to establish data communication with the communication terminal apparatus, and a wireless communication apparatus side control unit configured to administer the trigger transmitting unit to transmit the trigger signal upon establishing the data communication with the communication terminal apparatus. The communication terminal apparatus includes a trigger receiving unit configured to receive the trigger signal, a communication terminal apparatus side data communication unit configured to establish data communication with the wireless communication apparatus side data communication unit, and a communication terminal apparatus side control unit configured to activate the communication terminal apparatus side data communication unit when the trigger signal is received by the trigger signal receiving unit.

According to another embodiment of the present invention, when the communication terminal apparatus side data communication unit does not establish data communication for a predetermine time period after the trigger signal is received by the trigger receiving unit, the communication terminal apparatus side control unit stops operation of the communication terminal apparatus side data communication unit.

According to another embodiment of the present invention, the communication terminal apparatus corresponds to an electronic price tag.

According to another aspect of the present invention, an electronic price tag system is provides that is configured to establish wireless communication between a wireless station and an electronic price tag, the system including:

a trigger signal transmission line configured to transmit a trigger signal from the wireless station to the electronic price tag; and a data communication line configured to establish data communication between the wireless station and the electronic price tag;

wherein the data communication between the wireless station and the electronic price tag is established in response to the trigger signal that is transmitted by the trigger signal transmission line.

According to an aspect of the present invention, a trigger signal transmission line for transmitting a trigger signal from a wireless communication apparatus to a communication terminal apparatus, and a data communication line for establishing data communication between the wireless communication apparatus and the communication terminal apparatus are provided, and the data communication between the wireless communication apparatus and the communication terminal apparatus may be established in response to the trigger signal that is transmitted by the trigger signal transmission line so that the data communication between the wireless communication apparatus and the communication terminal apparatus may not have to be established on a continual basis and the power consumption for data communication may be reduced.

DETAILED DESCRIPTION OF THE PREFERRED EMBODIMENTS

In the following, principles and embodiments of the present invention will be described with reference to the accompanying drawings.

[System Configuration]

In the following, an electronic price tag system is described as an exemplary application of a wireless communication system according to an embodiment of the present invention.

Figure 1:
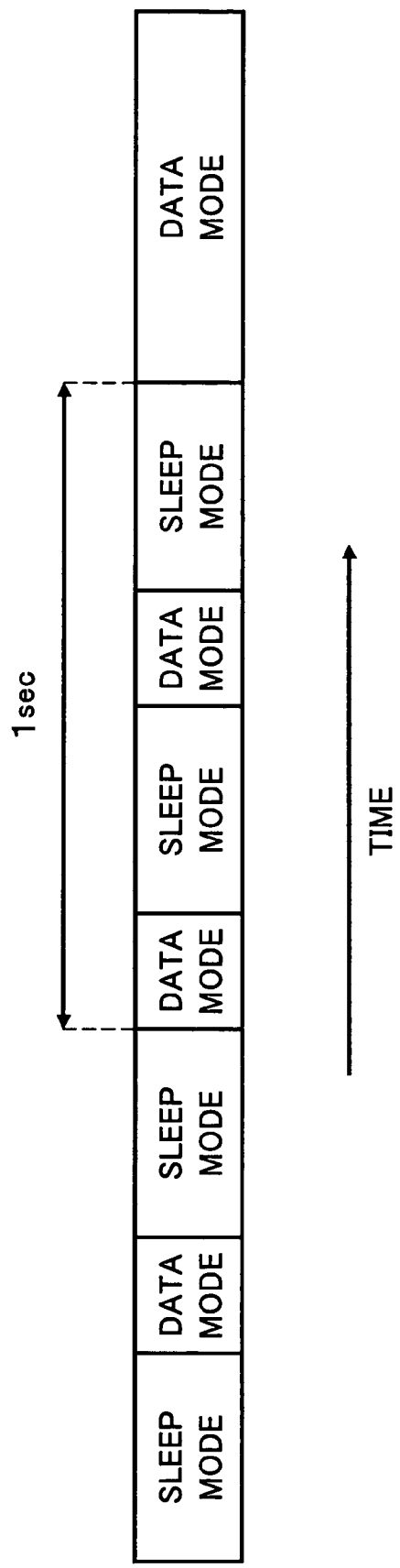
FIG. 1 is a diagram illustrating a data communication operation using a radio communication scheme according to the prior art.
Figure 2:
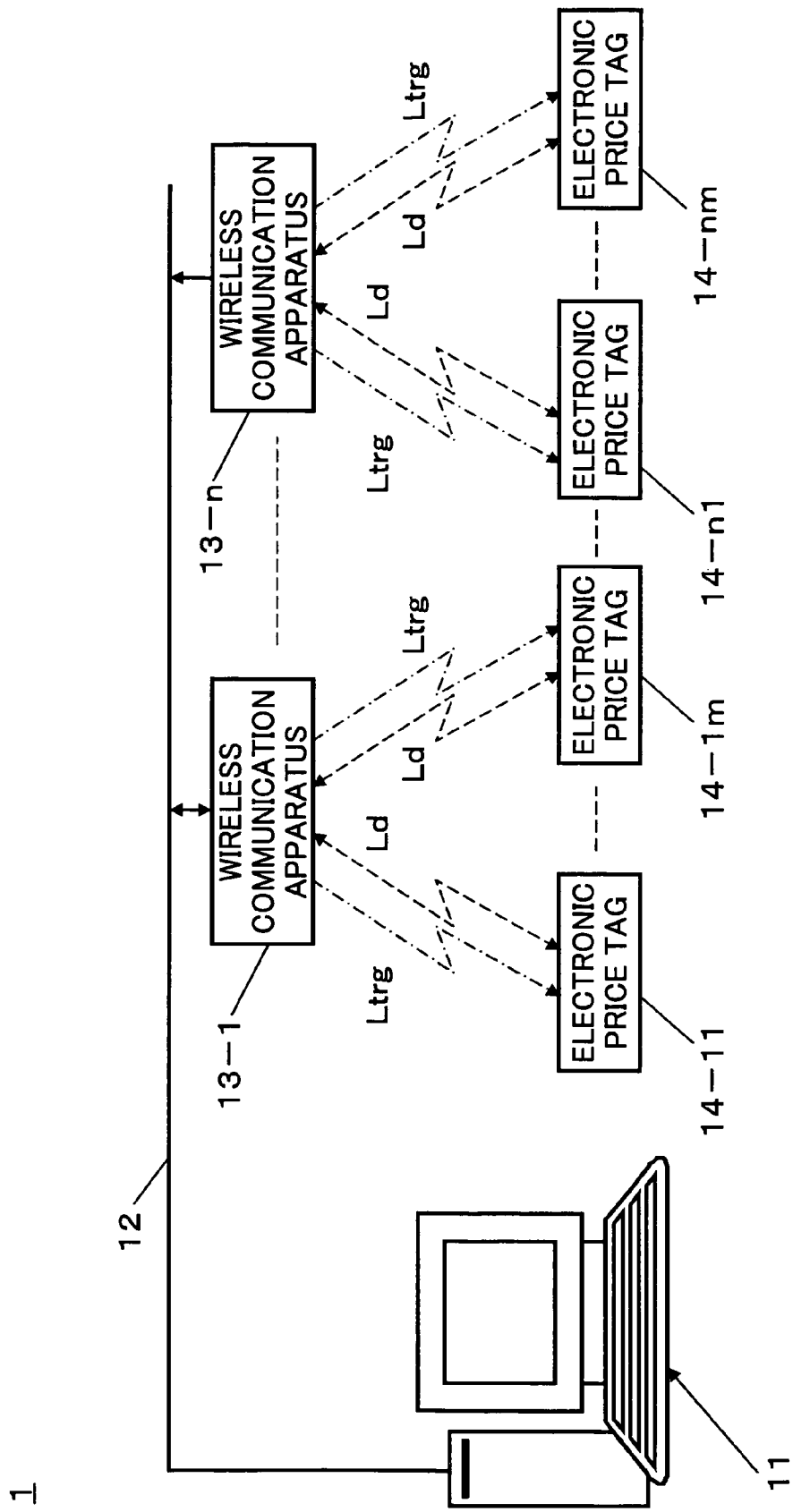
FIG. 2 is a block diagram showing a configuration of a wireless communication system according to an embodiment of the present invention.

FIG. 2 is a block diagram showing a configuration of an electronic price tag system according to an embodiment of the present invention.

The electronic price tag system 1 as is illustrated in this drawing includes a server 11, a network 12, wireless communication apparatuses 13-1~13-n, and electronic price tags 14-11~14-1m through 14-n1~14-nm. The electronic price tag system of the present embodiment may be implemented at a relatively large-scale retail store such as a super market or a convenience store, for example. The electronic price tag system 1 may be-arranged to establish wireless communication to enable rewriting of price displays of the electronic price tags 14-11~14-1m through 14-n1~14-nm that are each placed in the vicinity of their corresponding commodity and are arranged to indicate the price of their corresponding commodity.

According to the present embodiment, the server 11 is arranged to be capable of requesting rewriting of the price displays of the electronic price tags 14-11~14-1m through 14-n1~14-nm by sending a signal to the wireless communication apparatuses 13-1~13-n via the network 12. The network 12 may correspond to a wired network or a wireless network such as a wired LAN (local area network), a wireless LAN, or a wireless PAN (personal area network).

The wireless communication apparatuses 13-1~13-n may be placed on the ceiling of a store, for example, and may be arranged to establish a communication line with the electronic price tags 14-i1~14-1m through 14-n1~14-nm according to the request from the server 11 to enable data communication with the server 11. A given wireless communication apparatus 13-i of the wireless communication apparatuses 13-1~13-n may be linked to its subordinate electronic price tags 14-i1~14-im via two different wireless lines, namely, a trigger signal transmission line Ltrg and a data communication line Ld. The trigger signal transmission line Ltrg may be arranged to transmit a trigger signal from the wireless communication apparatus 13-i to the electronic price tags 14-i1~14-im. The data communication line may correspond to a wireless line for establishing data communication between the wireless communication apparatus 13-i and the electronic price tags 14-i1~14-im. It is noted that the data communication between the wireless communication apparatus 13-i and the electronic price tags 14-i1~14-im is realized by a communication scheme capable of establishing bidirectional data communication.

According to the above-described arrangement, a trigger signal from the wireless communication apparatus 13-i is arranged to be transmitted to the electronic price tags 14-i1~14-im; however, the present invention is not limited to such an arrangement, and for example, an arrangement may be realized in which the trigger signal from the wireless communication apparatus 13-i may be transmitted to other electronic price tags 14-11~14-1m through 14-n1~14-nm. Also it is noted that in the above-described arrangement, data communication is established between the wireless communication apparatus 13-i and the electronic price tags 14-i1~14-im; however an arrangement may be realized in which the wireless communication apparatus 13-i may be capable of establishing data communication with other electronic price tags 14-11~14-1m through 14-n1~14-nm.

In a case where a request is made by the server 11 to change the price display of a given electronic price tag 14-i of the electronic price tags 14-i1~14-im, the wireless communication apparatus 13-$i$ may transmit a trigger signal to the electronic price tags 14-$i$1~14-$im$ via the trigger signal transmission line Ltrg. Upon receiving the trigger signal, the electronic price tags 14-$i$ may establish a data communication line Ld with the wireless communication apparatus 13-$i$. In this way, data communication may be established between the wireless communication apparatus 13-$i$ and the electronic price tag 14-$i$. It is noted that communication means requiring little power such as radio wave, light, or sonic wave may be used for establishing the trigger signal transmission line Ltrg to reduce the power consumption during communication.

[Server 11]

In the following, a configuration of the server 11 is described.

Figure 3:
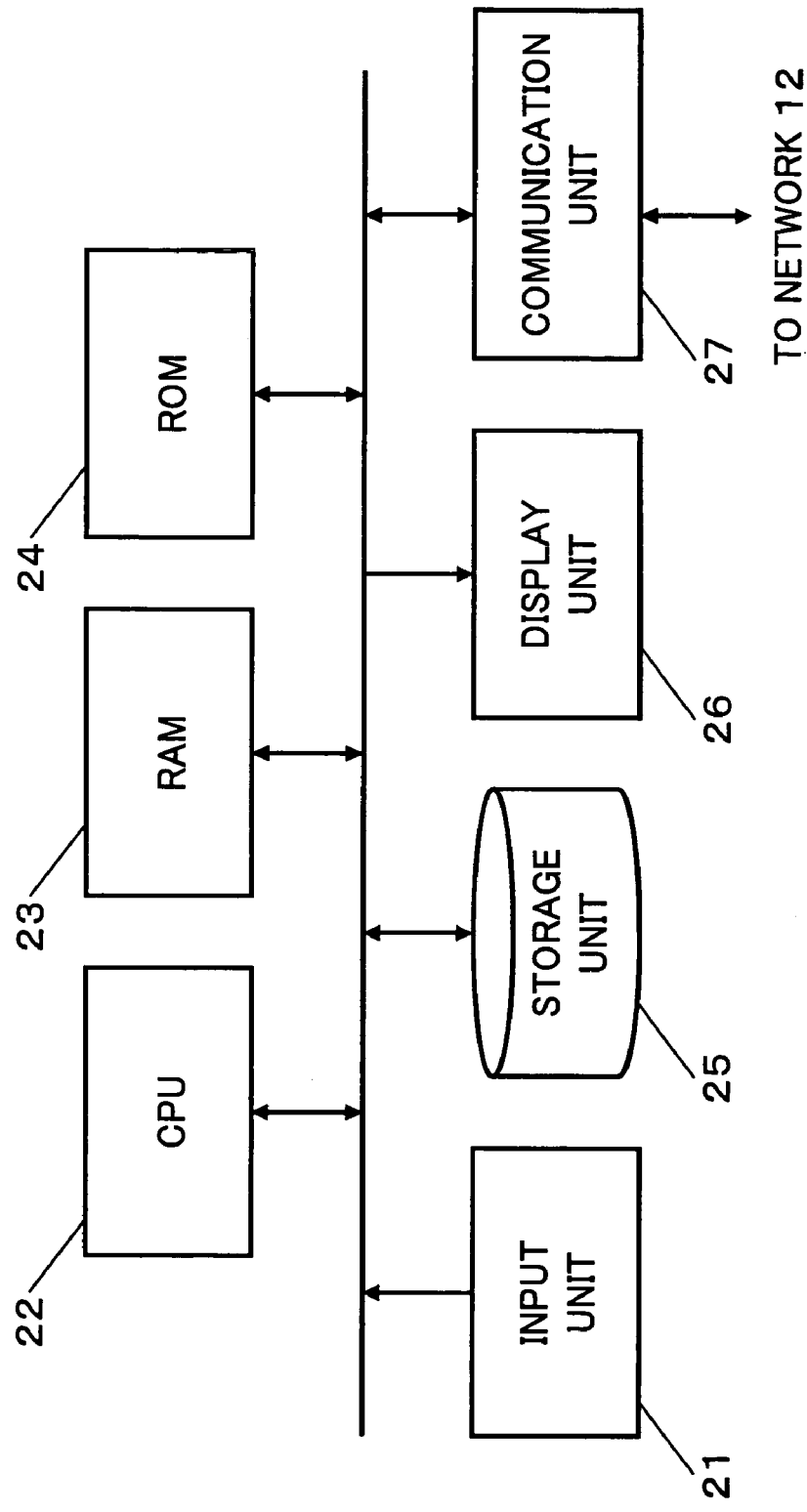
FIG. 3 is a block diagram showing a configuration of a server.

FIG. 3 is a block diagram showing a configuration of the server 11.

The server 11 may be realized by a computer system, for example, that is arranged to execute processes based on one or more programs installed thereto which processes may include setting the prices of commodities indicated by the electronic price tags 14-11~14-1$m$ through 14-$n$1~14-$nm$, managing the commodities, reflecting the set prices in a POS (point of sales) system, and reflecting the price setting of the POS system in the electronic price tags 14-11~14-1$m$ through 14-$n$1~14-$nm$. According to the present embodiment, the server 11 includes an input unit 21, a CPU 22, a RAM 23, a ROM 24, a storage unit 25, a display unit 26, and a communication unit 27.

The input unit 21 may include a keyboard and a mouse, for example, and may be arranged to input information pertaining to commodity prices, for example, and direct the transmission of the input information.

The CPU 22 may be arranged to execute processes according to one or more programs stored in the storage unit 25. The RAM 23 may be accessed and used as a working memory area by the CPU 22. The ROM 24 may be arranged to store various sets of information that are used for operating the server 11.

The storage unit 25 may correspond to a hard disk drive unit, a CD-ROM, or a DVD-ROM that is arranged to store programs or data, for example. The display unit 26 may correspond to a CRT (cathode ray tube) or an LCD (liquid crystal display) that is arranged to display information according to display data from the CPU 22.

The communication unit 27 may be arranged to establish communication with the wireless communication apparatuses 13-1~13-$n$ via the network 12.

[Wireless Communication Apparatus 13-$i$]

In the following, a configuration of the wireless communication apparatus 13-$i$ is described.

The wireless communication apparatus 13-$i$ as is shown in this drawing includes a communication apparatus 31, a microcomputer 32, a trigger transmitting unit 33, an antenna 34, and a data communication unit 35.

According to the present embodiment, the communication unit 31 is connected to the server 11 via the network 12 and is arranged to control communication with the server 11. The microcomputer 32 is connected to the communication unit 31, the trigger transmitting unit 33, and the data communication unit 35, and is arranged to control the trigger transmitting unit 33 according to a communication request from the server 11 to transmit the trigger signal to the electronic price tags 14-$i$1~14-$im$ via a trigger signal transmission line Ltrg, and control the data communication unit 35 to establish a data communication line with the electronic price tags 14-$i$1~14-$im$ according to directions from the electronic price tags 14-$i$1~14-$im$.

The trigger transmitting unit 33 may be arranged to generate and transmit a trigger signal according to directions from the microcomputer 32. For example, the trigger transmitting unit 33 may transmit a trigger signal into space in the form of radio wave, light, or sonic wave.

In a case where the trigger transmitting unit 33 transmits a radio wave signal as a trigger signal, the trigger signal generated at the trigger transmitting unit 33 may be supplied to the antenna 34, and the antenna 34 may be arranged to transmit a radio wave signal according to the trigger signal from the trigger transmitting unit 33.

The antenna 34 may also be arranged to receive a radio wave signal from the electronic price tags 14-$i$1~14-$im$. The radio wave signal received at the antenna 34 may be converted into an electric signal and supplied to the data communication unit 35.

The data communication unit 35 may correspond to a communication circuit for establishing a data communication line Ld with the electronic price tags 14-$i$1~14-$im$. For example, the data communication unit 35 may be realized by an IC chip that is configured to establish communication according to an advanced radio communication scheme conforming to the IEEE802.15.1 or IEEE802.15.4 standard. In this case, since the data communication line Ld may establish data communication with radio wave using an advanced communication scheme, the data communication quality may not be significantly affected by factors such as obstacles and noise.

In the following, an operation of the wireless communication apparatus 13-$i$ is described.

Figure 4:
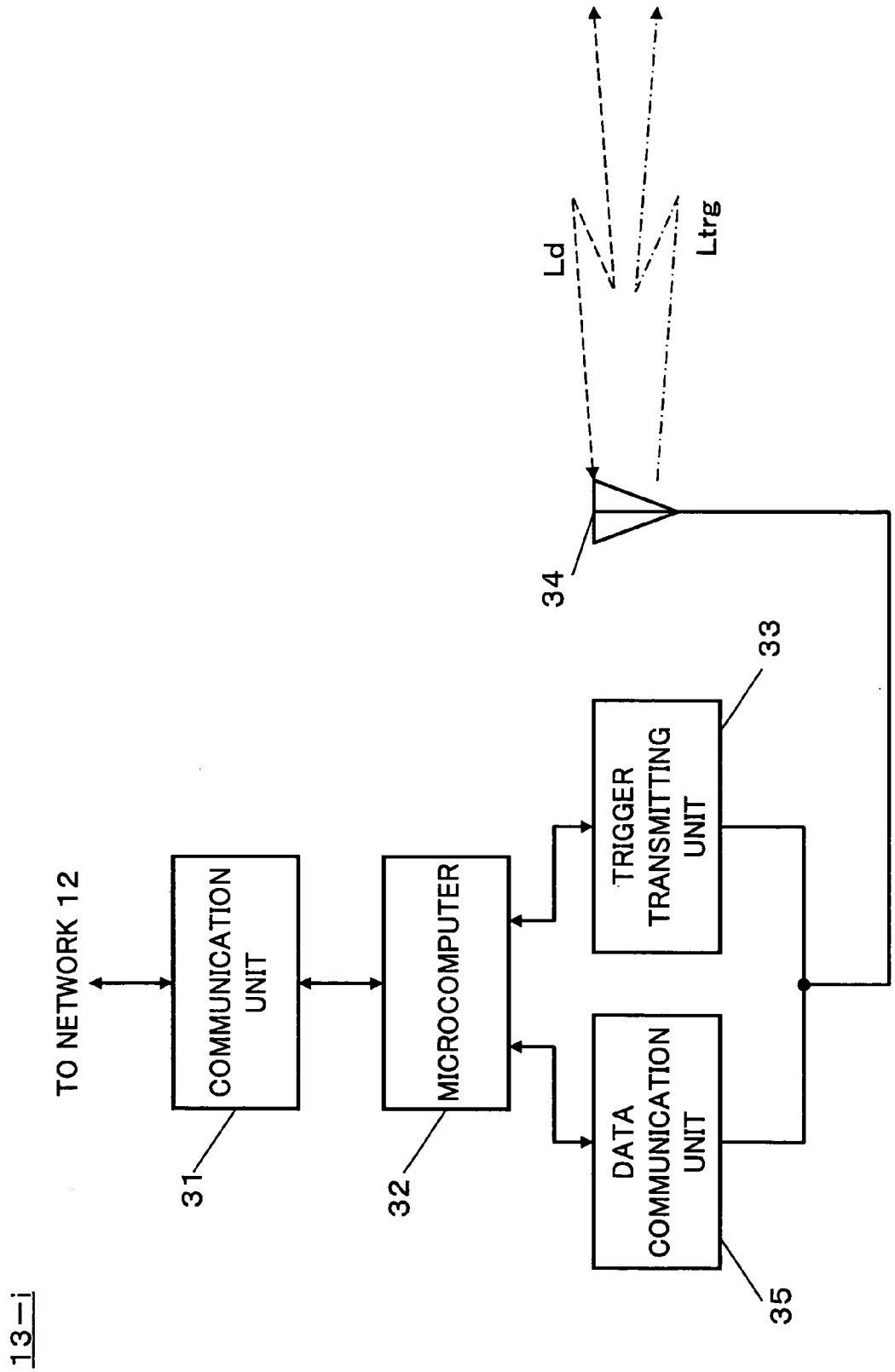
FIG. 4 is a block diagram showing a configuration of a wireless communication apparatus.
Figure 5:
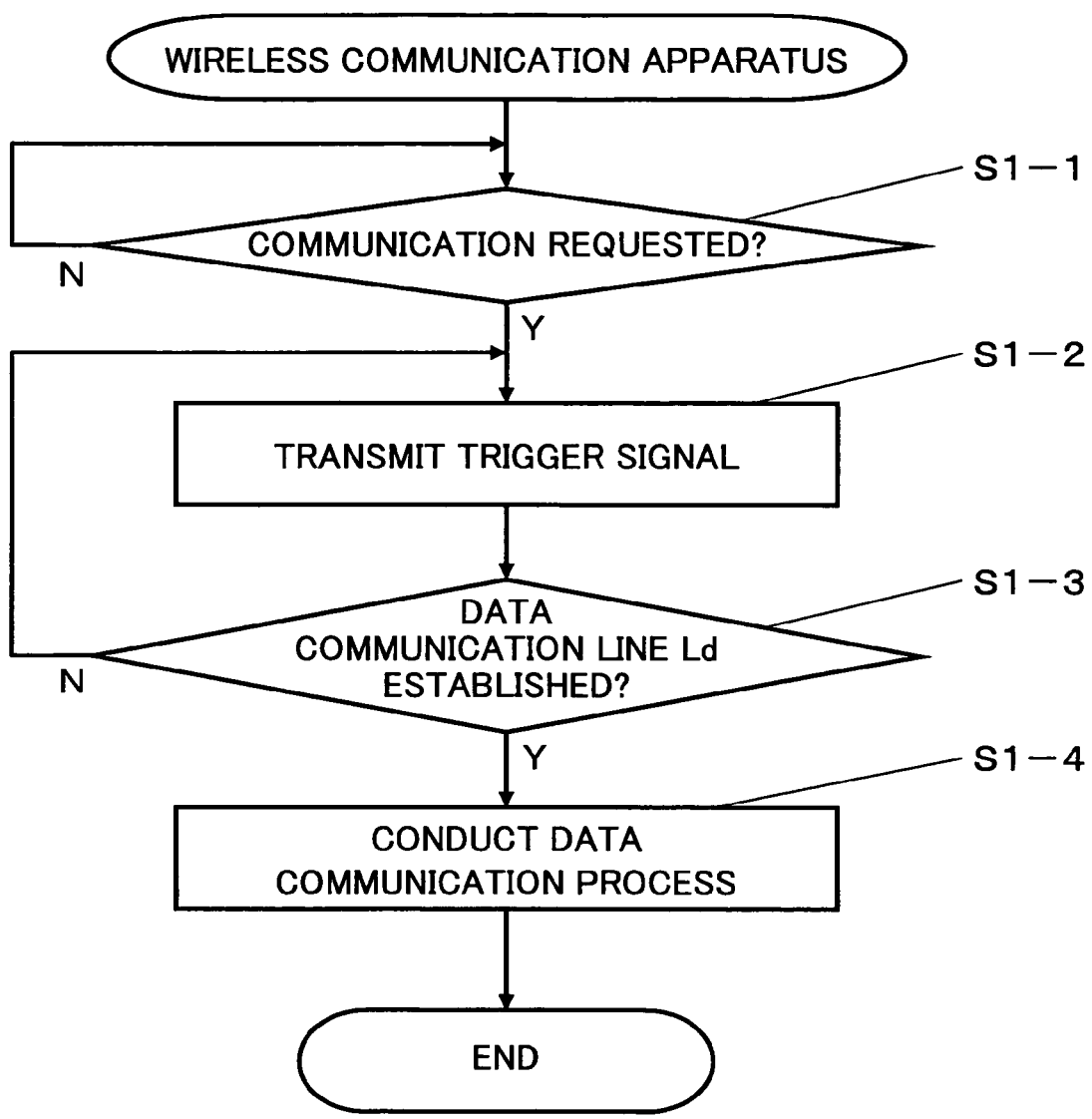
FIG. 5 is a flowchart illustrating an operation of the wireless communication apparatus.

FIG. 4 is a flowchart illustrating an exemplary operation of the wireless communication apparatus 13-$i$.

According to this drawing, in step S1-1, the wireless communication apparatus 13-$i$ determines whether communication with an electronic price tag 14-$i$ is requested by the server 11. If communication with the electronic price tag 14-$i$ is requested by the server 11 (step S1-1, Y), the wireless communication unit 13-$i$ controls the trigger transmitting unit 33 to transmit a trigger signal (step S1-2).

Then, in step S1-3, the wireless communication apparatus 13-$i$ determines whether a data communication line Ld with the electronic price tag is established. If the data communication line Ld is established, the wireless communication apparatus 13-$i$ executes a data communication process with the electronic price tag 14-$i$ (step S1-4).

[Electronic Price Tag 14-$i$]

In the following, a configuration of the electronic price tag 14-$i$ is described.

Figure 6:
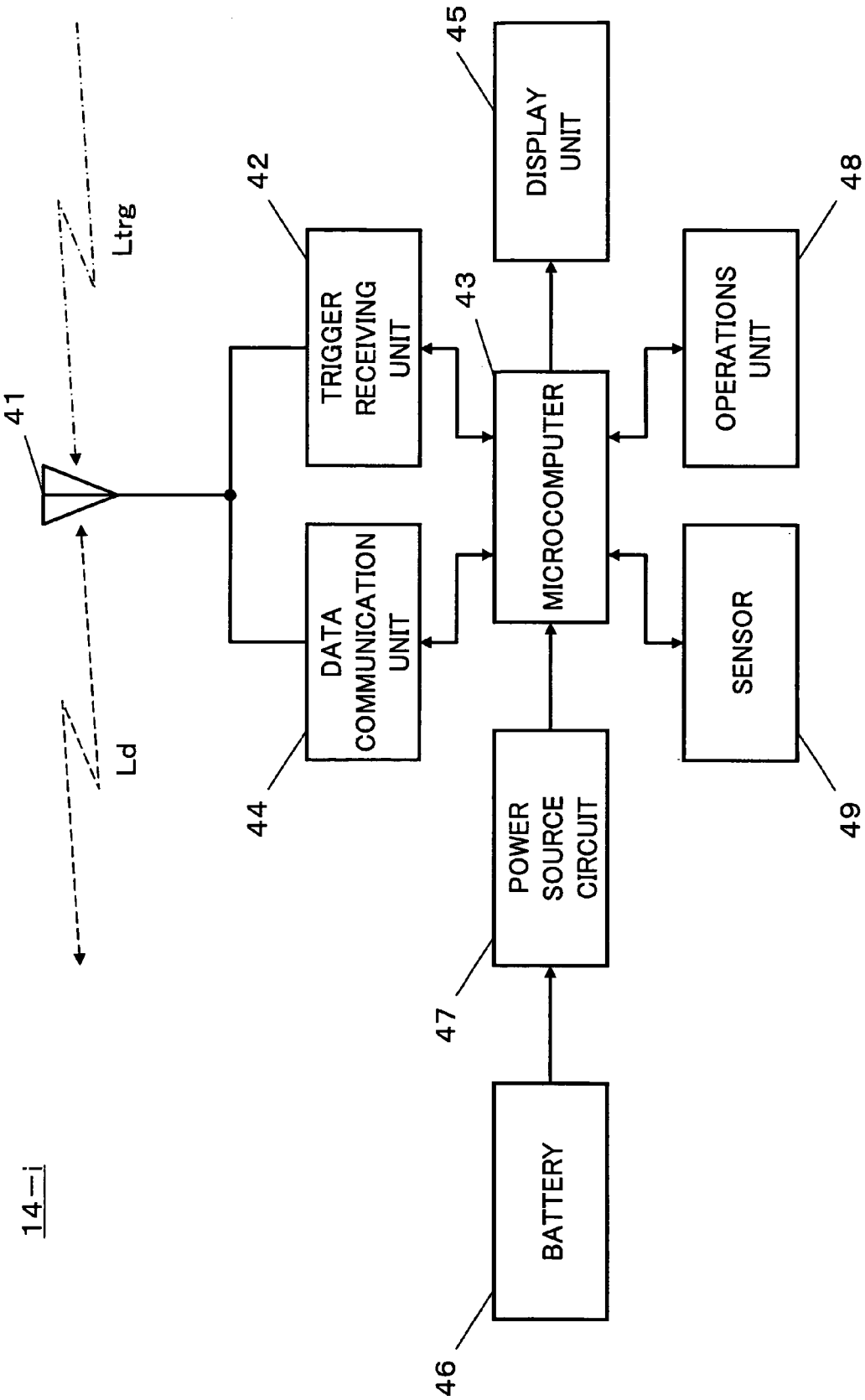
FIG. 6 is a block diagram showing a configuration of an electronic price tag.

FIG. 6 is a block diagram showing an exemplary configuration of the electronic price tag 14-$i$.

According to this drawing, the electronic price tag 14-$i$ includes an antenna 41, a trigger receiving unit 42, a microcomputer 43, a data communication unit 44, a display unit 45, a battery 46, a power source circuit 47, an operations unit 48, and a sensor 49.

The antenna 41 may be arranged to receive a radio wave signal. The radio wave signal received at the antenna 41 may be converted into an electric signal to be supplied to the trigger receiving unit 42 and the data communication unit 44. The trigger receiving unit 42 may be arranged to be operating on a continual basis in order to receive an incoming trigger signal.

The microcomputer 43 may be connected to the trigger receiving unit 42, the data communication unit 44, the display unit 45, the operations unit 48, and the sensor 49, for example, and may be arranged to execute data processing based on one or more pre-installed programs.

The data communication unit 44 may correspond to a wireless communication circuit for establishing a data communication line Ld with a wireless communication apparatus 13-$i$, and may include an IC chip that is configured to establish communication using an advanced radio communication scheme conforming to the IEEE802.15.1 or IEEE802.15.4 standard, for example.

The display unit 45 may be realized by an LCD, for example, that is configured to display information such as price information according to control operations of the microcomputer 43.

The battery 46 may correspond to a button type battery, for example, that is arranged to generate a direct current voltage. The direct current voltage generated at the battery 46 may be supplied to the power source circuit 47. The power source circuit 47 may be arranged to generate a power source voltage for internal use from the direct current voltage generated at the battery 46, and supply the generated power source voltage to units such as the microcomputer 43.

The operations unit 48 may include a switch, for example. The operations unit 48 may be operated by a salesperson when commodity inventory is running low, for example. In response to an operation of the operations unit 48, the microcomputer may activate the data communication unit 44 and establish a data communication line Ld with the wireless communication apparatus 13-$i$ to send a notification to the server 11 indicating that an operation has been made on the operations unit 48. In this way, the server 11 may be made aware of the fact that the inventory of a commodity for which the operations unit 48 has been operated is running low, and appropriate measures may be taken to quickly replenish the inventory.

The sensor 49 may correspond to an infrared ray sensor or a temperature sensor, for example, that is arranged to gather information such as passersby information and temperature information of its surrounding. The information obtained by the sensor 49 may be transmitted to the server 11 when a data communication line Ld is established. Accordingly, the server 11 may be able to grasp the situation at a sales location based on the information gathered by the sensor 49.

In the following, an operation of the electronic price tag 14-$i$ is described.

Figure 7:
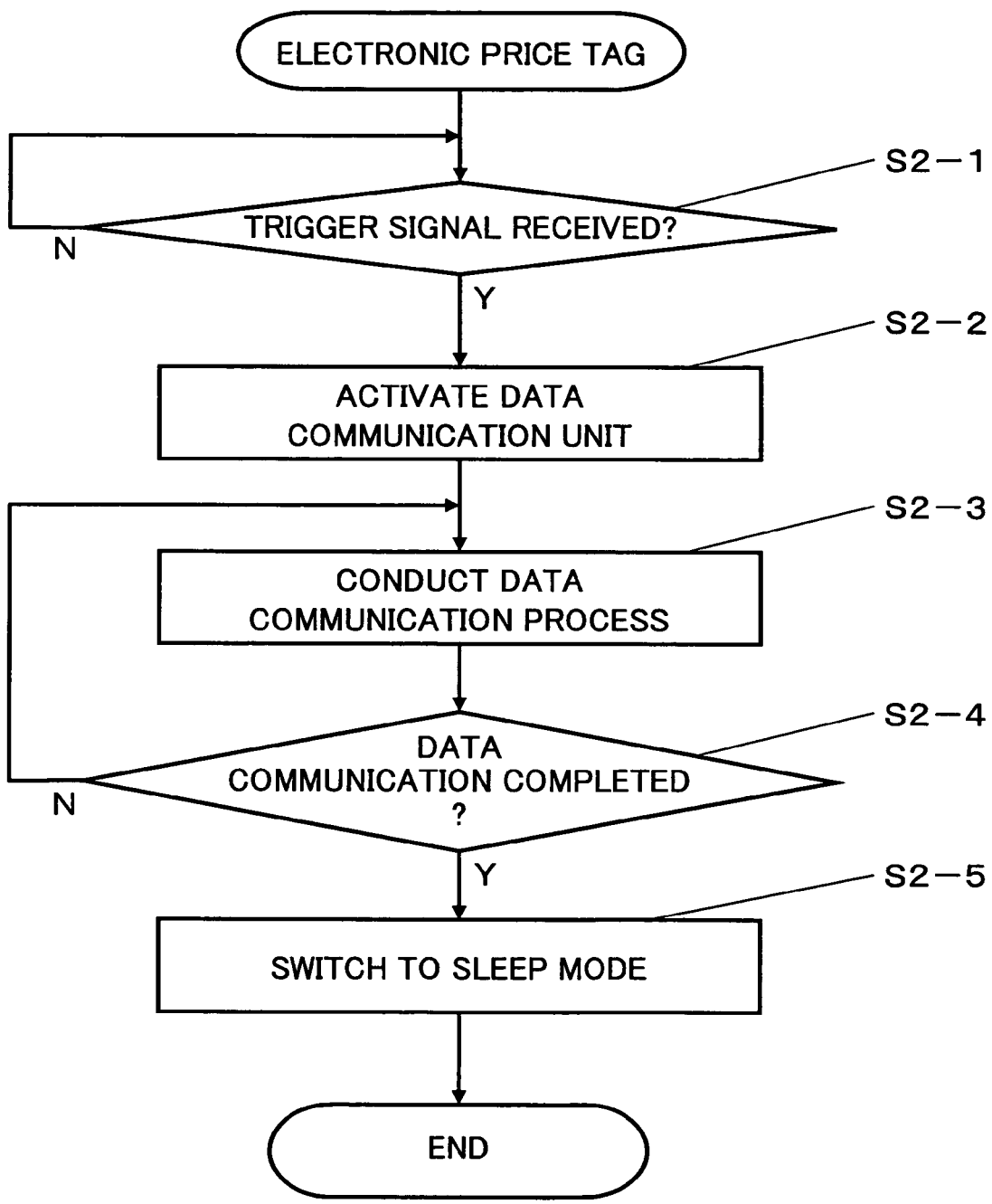
FIG. 7 is a flow chart illustrating an operation of the electronic price tag.

FIG. 7 is a flowchart showing an exemplary operation of the electronic price tag 14-$i$.

According to this example, in step S2-1, the electronic price tag 14-$i$ determines whether a trigger signal has been received at the trigger receiving unit 42. If a trigger signal is received at the trigger signal receiving unit 42, the electronic price tag 14-$i$ activates the data communication unit 44 in step S2-2. When the data communication unit 44 is activated, a data communication line Ld may be established between the electronic price tag 14-$i$ and the wireless communication apparatus 13-$i$.

Then, in step S2-3, the electronic price tag 14-$i$ conducts a data communication process using the established data communication line Ld. In step S2-4, the electronic price tag 14-$i$ determines whether the data communication process is completed. If the data communication process is completed, the electronic price tag 14-$i$ switches the data communication unit 44 to sleep mode in step S2-5.

As can be appreciated from the above descriptions, the electronic price tag 14-$i$ may be arranged to activate the data communication unit 44, which has a high power consumption rate, only when a trigger signal from the wireless communication unit 13-$i$ is supplied to the trigger receiving unit 42 so that the power consumption of the electronic price tag 14-$i$ may be reduced.

[Overall Operation]

Figure 8:
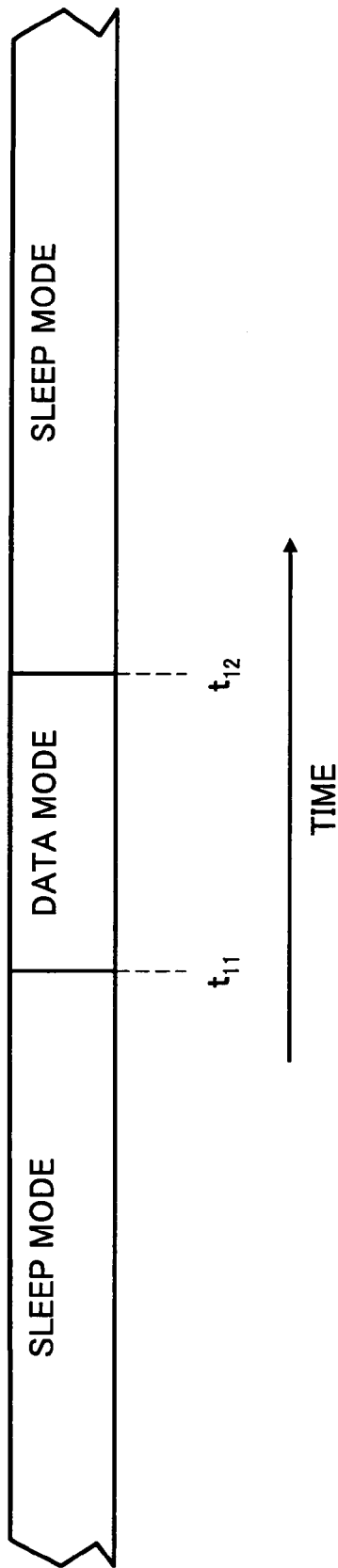
FIG. 8 is a diagram illustrating a data communication operation according to an embodiment of the present invention.

FIG. 8 is a diagram illustrating an overall data communication operation according to an embodiment of the present invention.

According to the present example, when a data communication request is sent to the wireless communication apparatus 13-$i$ from the server 11, the wireless communication apparatus 13-$i$ transmits a trigger signal from the trigger transmitting unit 33 to the electronic price tags 14-$i$1~14-$im$. Upon receiving the trigger signal from the wireless communication apparatus 13-$i$, the electronic price tags 14-$i$1~14-$im$ may switch their data communication units 44 to operating mode for establishing a data communication line Ld. In this way, data communication may be established between the wireless communication apparatus 13-$i$ and the electronic price tags 14-$i$1~14-$im$. It is noted that the data communication units 44 of the electronic price tags 14-$i$1~14-$im$ are set to sleep mode before time t11 at which the trigger signal is supplied and after time t12 at which the data communication is ended. In other words, the data communication units 44 of the electronic price tags 14-$i$1~14-$im$ may be switched to operating mode only when data communication is being established so that the power consumption of the electronic price tags 14-$i$1~14-$im$ may be reduced.

It is noted that a trigger signal may be composed of trigger code or a combination of trigger code and ID code, for example.

Figure 9A:
FIGS. 9A and 9B are diagrams illustrating exemplary data structures of a trigger signal.
Figure 9B:
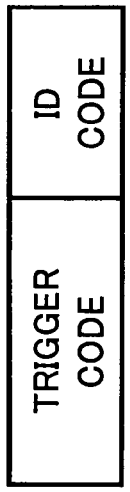

FIGS. 9A and 9B are diagrams illustrating exemplary data structures of a trigger signal.

The trigger code shown in FIGS. 9A and 9B may correspond to a simple pulse signal containing predetermined code for a corresponding wireless communication apparatus 13-$i$. The ID code shown in FIG. 9B may correspond to code for identifying a corresponding electronic price tag 14-$i$.

In the case of transmitting a trigger signal composed of trigger code as is shown in FIG. 9A, the data communication unit 44 of each of the electronic price tags 14-$i$1~14-$im$ under the wireless communication apparatus 13-$i$ is activated to establish data communication, and the electronic price tag 14-$i$ corresponding to the data communication counterpart is determined through data communication with the data communication unit 35 of the wireless communication apparatus 13-$i$. In turn, data communication with the electronic price tag 14-$i$ is maintained while the rest of the electronic price tags 14-$i$1~14-$im$ are switched back to sleep mode.

According to this example, even in a case of multicasting data to the electronic price tags 14-$i$1~14-$im$, the data communication units 44 of the electronic price tags 14-$i$1~14-$im$ may be activated by one trigger signal transmission, and data with a header attached thereto may be transmitted to each of the electronic price tags 14-$i$1~14-$im$ while the data communication units 44 of the electronic price tags 14-$i$1~14-$im$ are in operating mode. In this way, data may be transmitted to each of the electronic price tags 14-$i$1~14-$im$ by conducting one activation operation on the data communication units 44. According to an embodiment, the duration from the time the data communication units 44 are activated to the time these units are switched back to sleep mode may be lengthened to adapt to such a situation.

In a case of using a trigger signal composed of trigger code and ID code as is shown in FIG. 9B, the microcomputer 43 of each of the electronic price tags 14-$i$1~14-$im$ may identify the ID code received at the trigger receiving unit 42, and the data communication unit 44 of an electronic price tag 14-$i$ corresponding to the ID code may be activated so that further power consumption reduction may be realized.

[Advantages]

According to an embodiment of the present invention, when a trigger signal is supplied to the electronic price tags 14-11~14-1m through 14-n1~14-nm from the wireless communication apparatuses 13-1~13-n, the data communication units 44 of the electronic price tags 14-11~14-1m through 14-n1~14-nm may be set to operating mode so that a data communication line Ld for establishing data communication with a corresponding wireless communication apparatus 13-i may be activated. In this way, price data for the electronic price tags 14-11~14-1m through 14-n1~14-nm may be updated. Also, according to an embodiment, the electronic price tags 14-11~14-1m through 14-n1~14-nm may switch their data communication units 44 to sleep mode when data communication with their corresponding wireless communication apparatus 13-1~13-n is completed. In this way, the data communication units 44, which have a large power consumption rate, may be arranged to be activated only when data communication is being conducted so that the power consumption of the battery-driven electronic price tags 14-11~14-1m through 14-n1~14-nm may be reduced. In this way the service life of the electronic price tags 14-11~14-1m through 14-n1~14-nm may be extended.

Also, according to an embodiment, by using an advanced radio communication scheme for the data communication line Ld, the data communication may not be affected by factors such as obstacles and noise so that information such as price information may be accurately conveyed and advanced security may be provided through data encryption so that a reliable system may be realized.

It is noted that in the electronic price tag 14-i according to the present embodiment, the trigger receiving unit 42 is arranged to be operating on a continual basis. However, the trigger receiving unit 42 may also be arranged to alternate between operating mode and off mode. By realizing such intermittent operation of the trigger receiving unit 42, the power consumption of the battery 46 may be reduced further.

Figure 10:
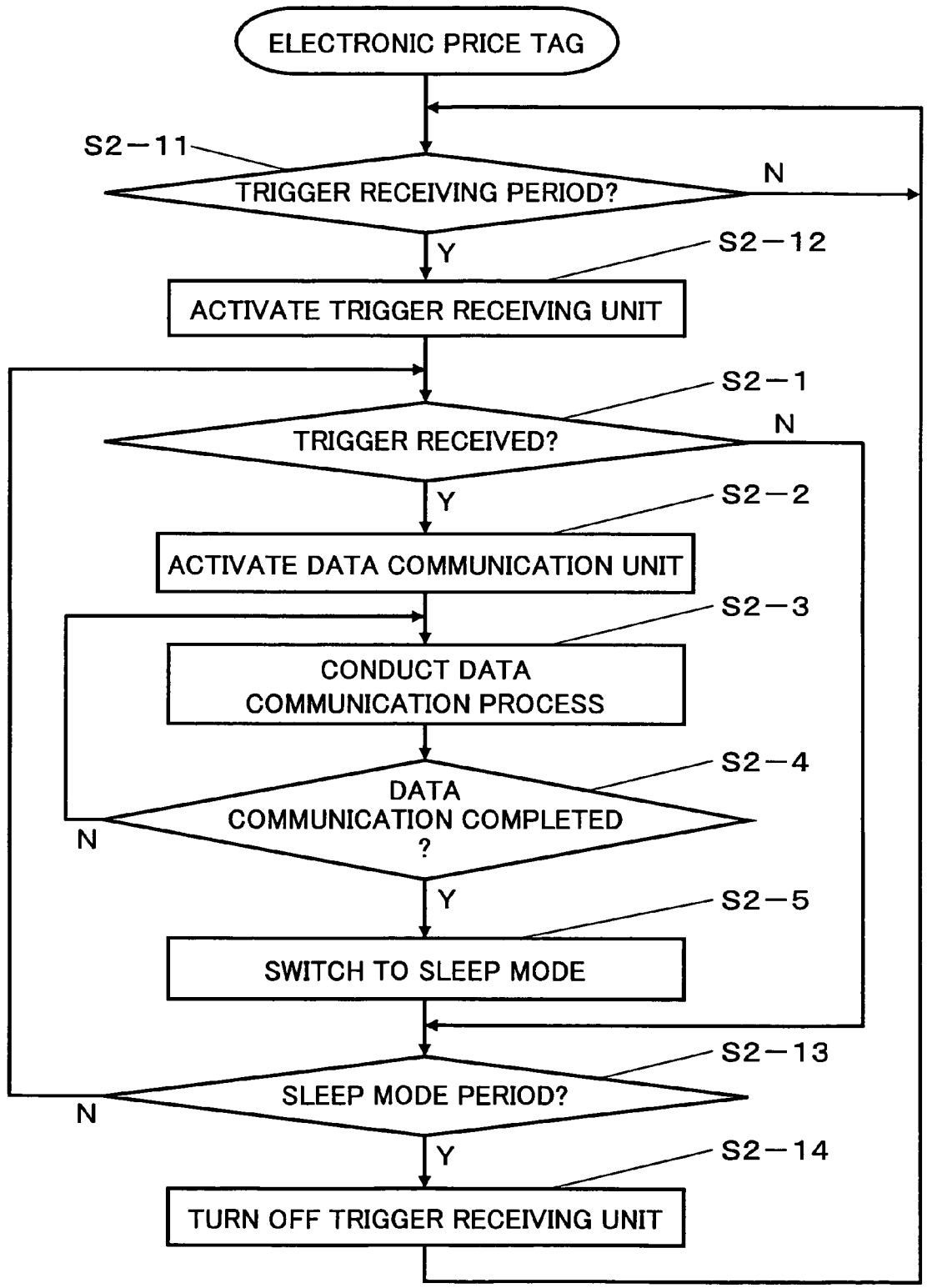
FIG. 10 is a flowchart illustrating an operation of an electronic price tag that is arranged to be intermittently activated.

FIG. 10 is a flowchart illustrating an exemplary operation flow of an electronic price tag 14-i that is arranged to be intermittently activated. It is noted that process steps of the present example that are identical to those illustrated in FIG. 7 are assigned the same numerical references and their descriptions are omitted.

According to the present example, in step S2-11, the electronic price tag 14-i determines whether the trigger receiving unit 42 has entered an operating period (trigger receiving period). When the trigger receiving unit 42 enters a trigger receiving period, the electronic price tag 14-i sets the trigger receiving unit 42 to operating mode (step S2-12). After the trigger receiving unit 42 is set to operating mode in step S2-12, the operation of the electronic price tag 14-i proceeds to step S2-1.

It is noted that in the case of intermittent operation of the trigger receiving unit 42, when a trigger signal is not received in step S2-1, the operation proceeds to step S2-13. In step S2-13, it is determined whether the operating period of the trigger receiving unit 42 has ended. During the operation period of the trigger receiving unit 42, the electronic price tag 14-i is arranged to repetitively execute the process steps S2-1 through S2-5. When it is determined in step S2-13 that the operating period of the trigger receiving unit 42 has ended, the electronic price tag 14-i switches the trigger receiving unit 42 to off mode in step S2-14, after which the operation goes back to step S2-11. It is noted that periods of the intermittent operation of the trigger receiving unit 42 may be controlled by the microcomputer 43.

In such case, period code for setting the intermittent operating period of the intermittent operation of the trigger receiving unit 42 may be included in the trigger signal transmitted from the wireless communication apparatus 13-i. Accordingly, the trigger receiving unit 42 of the electronic price tag 14-i may receive the trigger signal when it is in an operating mode, and analyze the period code included in the received trigger signal to obtain period information based on which the intermittent operating period of the trigger receiving unit 42 may be set to the microcomputer 43. In this way, the intermittent operating periods of the electronic price tags 14-11~14-1m through 14-n~14-nm may be flexibly set by the server 11, It is noted that the intermittent operating periods of the electronic price tags 14-11~14-1m through 14-n~14-nm may also be set through data communication with the corresponding wireless communication apparatus 13-1~13-n using the data communication line Ld.

It is further noted that in the present embodiment, a radio wave signal is used as a trigger signal. However, the trigger may be realized by any type of signal that is capable of triggering the operation of the data communication units 44 of the electronic price tags 14-11~14-1m through 14-n~14-nm. For example, the trigger signal may be realized by other communication means such as light, sonic wave, vibration, or magnetic force. Also, it is noted that the same communication means may be used to realize trigger signal transmission and data communication. For example, radio wave of the same frequency, the same modulation format, or the same spectrum diffusion format may be used.

It is further noted that in the embodiment described above, the present invention is applied to an electronic price tag system. However the present invention is not limited to such an application, and for example, the present invention may be applied to other various wireless communication systems including sensor network systems such as a building maintenance system or an intelligent home appliance network system, as well as terminal apparatuses such as sensor terminals used in such systems.

The present application is based on Japanese Patent Application No. 2004-111266 filed on Apr. 5, 2004, the entire contents of which are hereby incorporated by reference.

What is claimed is:

1. A wireless communication system that is configured to establish wireless communication between a wireless communication apparatus and a communication terminal apparatus using a trigger signal transmission line, the system comprising:

said trigger signal transmission line being configured to transmit a trigger signal from the wireless communication apparatus to the communication terminal apparatus; and a data communication line configured to establish data communication between the wireless communication apparatus and the communication terminal apparatus in response to the trigger signal transmitted by the trigger signal transmission line, with the trigger signal transmission line and the data communication line being separate and independent wireless lines, wherein the wireless communication apparatus is configured to generate the trigger signal with an intermittent period code for setting an intermittent operating period in the communication terminal apparatus, and to transmit the generated trigger signal to the communication terminal apparatus via the trigger signal transmission line; and with the communication terminal apparatus being configured to intermittently activate a function for receiving the trigger signal in the communication terminal apparatus with a period indicated by the intermittent period code in the trigger signal wherein the communication terminal apparatus intermittently activates the function without receiving another trigger signal after receiving the trigger signal which includes the intermittent period code.

2. The wireless communication system as is claimed in claim 1, wherein:

the wireless communication apparatus includes a trigger transmitting unit configured to transmit the trigger signal;

a wireless communication apparatus side data communication unit configured to establish data communication with the communication terminal apparatus; and a wireless communication apparatus side control unit configured to administer the trigger transmitting unit to transmit the trigger signal upon establishing the data communication with the communication terminal apparatus; and the communication terminal apparatus includes a trigger receiving unit configured to receive the trigger signal;

a communication terminal apparatus side data communication unit configured to establish data communication with the wireless communication apparatus side data communication unit; and a communication terminal apparatus side control unit configured to activate the communication terminal apparatus side data communication unit when the trigger signal is received by the trigger signal receiving unit.

3. The wireless communication system as claimed in claim 2 wherein when the communication terminal apparatus side data communication unit does not establish data communication for a predetermine time period after the trigger signal is received by the trigger receiving unit, the communication terminal apparatus side control unit is configured to stop operation of the communication terminal apparatus side data communication unit.

4. The wireless communication system as claimed in claim 1, wherein the communication terminal apparatus corresponds to an electronic price tag.

5. The wireless communication system as claimed in claim 1, wherein:

the wireless communication apparatus is configured to generate a signal including identification code for identifying the communication terminal apparatus as the trigger signal, and transmit the generated trigger signal to the communication terminal apparatus via the trigger signal transmission line; and the communication terminal apparatus is configured to identify the identification code included in the trigger signal and conduct a data communication operation based on the identification code.

6. An electronic price tag system that is configured to establish wireless communication between a wireless station and an electronic price tag, the system comprising:

a trigger signal transmission line configured to transmit a trigger signal from the wireless station to the electronic price tag; and a data communication line configured to establish data communication between the wireless station and the electronic price tags in response to the trigger signal that is transmitted by the trigger signal transmission line with the trigger signal transmission line and the data communication line being separate and independent wireless lines, wherein the wireless station is configured to generate the trigger signal with an intermittent period code for setting an intermittent operating period in the electronic price tag, and for transmitting the generated trigger signal to the electronic price tag via the trigger signal transmission line; and with the electronic price tag being configured to be intermittently activated based on the intermittent period code in the trigger signal; and the communication terminal apparatus being configured to intermittently activate a function for receiving the trigger signal in the communication terminal apparatus with a period indicated by the intermittent period code in the trigger signal wherein the communication terminal apparatus intermittently activates the function without receiving another trigger signal after receiving the trigger signal which includes the intermittent period code 7. The electronic price tag system as claimed in claim 6, wherein the wireless station is configured to transmit to the electronic price tag a signal including identification code for identifying the electronic price tag as the trigger signal; and the electronic price tag is configured to identify the identification code included in the trigger signal and conduct a data communication operation based on the identification code.

8. A wireless communication apparatus that is configured to establish wireless communication with a communication terminal apparatus using a trigger signal transmission line, the wireless communication apparatus comprising:

a trigger transmitting unit comprising said trigger signal transmission line configured to transmit a trigger signal;

a wireless communication apparatus side data communication unit comprising a data communication line configured to establish data communication with the communication terminal apparatus in response to the trigger signal transmitted by the trigger signal transmission line, with the trigger signal transmission line and the data communication line being separate and independent wireless lines; and a wireless communication apparatus side control unit configured to administer the trigger transmitting unit to transmit the trigger signal and administer the wireless communication apparatus side data communication unit to establish data communication with the communication terminal apparatus; and the communication terminal apparatus being configured to intermittently activate a function for receiving the trigger signal in the communication terminal apparatus with a period indicated by the intermittent period code in the trigger signal wherein the communication terminal apparatus intermittently activates the function without receiving another trigger signal after receiving the trigger signal which includes the intermittent period code wherein the trigger transmitting unit is configured to generate a signal with an intermittent period code for setting an intermittent operating period in the communication terminal apparatus, and to transmit the generated trigger signal to the communication terminal apparatus via the trigger signal transmission line.

9. The wireless communication apparatus as claimed in claim 8 wherein the trigger transmitting unit is configured to generate a signal including identification code for identifying the communication terminal apparatus as the trigger signal and transmit the generated trigger signal to the communication terminal apparatus via the trigger signal transmission line.

10. The wireless communication system as claimed in claim 8, wherein the trigger transmitting unit which transmits the trigger signal from said trigger signal transmission line consumes less power than the data communication line.

11. A communication terminal apparatus that is configured to establish wireless communication with a wireless communication apparatus using a trigger signal transmission line, the communication terminal apparatus comprising:

said trigger signal transmission line being configured to transmit a trigger signal from the wireless communication apparatus to the communication terminal apparatus;

a trigger receiving unit configured to receive the trigger signal;

a communication terminal apparatus side data communication unit comprising a data communication line configured to establish data communication with the wireless communication apparatus with the data communication line and the trigger signal transmission line being separate and independent from one another; and a communication terminal apparatus side control unit configured to activate the communication terminal apparatus side data communication unit when the trigger signal is received by the trigger signal receiving unit, wherein the trigger signal includes intermittent code for setting an intermittent operating period in the trigger receiving unit; and the communication terminal apparatus side control unit is configured to intermittently activate the trigger receiving unit based on the intermittent code included in the trigger signal; and the communication terminal apparatus being configured to intermittently activate a function for receiving the trigger signal in the communication terminal apparatus with a period indicated by the intermittent period code in the trigger signal wherein the communication terminal apparatus intermittently activates the function without receiving another trigger signal after receiving the trigger signal which includes the intermittent period code.

12. The communication terminal apparatus as claimed in claim 11, wherein the trigger signal includes identification code for identifying the communication terminal apparatus; and the communication terminal apparatus side control unit is configured to identify the identification code included in the trigger signal and establish data communication based on the identification code.

13. A wireless communication method for establishing wireless communication between a wireless communication apparatus and a communication terminal apparatus using a trigger signal transmission line, the wireless communication apparatus including a trigger transmitting unit for transmitting a trigger signal from said trigger signal transmission line and a wireless communication apparatus side data communication unit comprising a data communication line which is separate and independent of said trigger signal transmission line for establishing data communication with the communication terminal apparatus, the communication terminal apparatus including a trigger receiving unit for receiving the trigger signal and a communication terminal apparatus side data communication unit for establishing data communication with the wireless communication apparatus side data communication unit, the method comprising the steps of:

activating the communication terminal apparatus side data communication unit when the trigger signal from the trigger transmitting unit is received by the trigger receiving unit; and establishing data communication between the wireless communication apparatus side data communication unit and the communication terminal apparatus side data communication unit, wherein the wireless communication apparatus is configured to generate the trigger signal with an intermittent period code for setting an intermittent operating period for intermittently activating the communication terminal apparatus, and to transmit the generated trigger signal to the communication terminal apparatus via the trigger signal transmission line;

the communication terminal apparatus is configured to be intermittently activated based on the intermittent period code in the trigger signal; and the communication terminal apparatus being configured to intermittently activate a function for receiving the trigger signal in the communication terminal apparatus with a period indicated by the intermittent period code in the trigger signal wherein the communication terminal apparatus intermittently activates the function without receiving another trigger signal after receiving the trigger signal which includes the intermittent period code.

14. The wireless communication method as claimed in claim 13, wherein the wireless communication apparatus is configured to transmit a signal including identification code for identifying the communication terminal apparatus as the trigger code; and the communication terminal apparatus is configured to identify the identification code included in the trigger code and establish data communication based on the identification code.

* * * * *